United States Patent [19]

Suzuki et al.

[11] Patent Number: 4,594,330
[45] Date of Patent: Jun. 10, 1986

[54] FINE AMORPHOUS POWDER AND PROCESS FOR PREPARING FINE POWDERY MIXTURE OF SILICON NITRIDE AND SILICON CARBIDE

[75] Inventors: Takashi Suzuki; Takamasa Kawakami; Takeshi Koyama, all of Niigata; Masami Orisaku, Matsudo; Kansei Izaki, Niigata; Rieko Nakano, Niigata; Akira Mori, Niigata, all of Japan

[73] Assignee: Mitsubishi Gas Chemical Company, Inc., Tokyo, Japan

[21] Appl. No.: 712,036

[22] Filed: Mar. 15, 1985

[30] Foreign Application Priority Data

Mar. 22, 1984 [JP] Japan ................................. 59-55172
Mar. 22, 1984 [JP] Japan ................................. 59-55173
Apr. 18, 1984 [JP] Japan ................................. 59-77790
May 8, 1984 [JP] Japan ................................. 59-91353
Nov. 12, 1984 [JP] Japan ................................. 59-238034

[51] Int. Cl.⁴ ............................................. C04B 35/52
[52] U.S. Cl. ................................. 501/92; 106/287.11; 106/287.13; 252/504; 252/516; 264/65; 264/332; 423/344; 423/345; 423/409; 423/439; 423/440; 501/97
[58] Field of Search ............... 501/92, 97; 423/345, 423/344, 409, 439, 440; 252/516, 504; 106/287.11, 287.13; 264/65, 332

[56] References Cited

U.S. PATENT DOCUMENTS

| | | | |
|---|---|---|---|
| 3,892,583 | 7/1975 | Winter et al. | 106/55 |
| 3,926,857 | 12/1975 | Matkin et al. | 501/92 |
| 3,954,483 | 5/1976 | Prochazka | 501/92 |
| 4,036,653 | 7/1977 | Jacobson | 106/55 |
| 4,122,155 | 10/1978 | Prochazka et al. | 423/344 |
| 4,184,882 | 1/1980 | Lange | 501/92 |
| 4,187,116 | 2/1980 | Lange | 501/92 |
| 4,335,217 | 6/1982 | Hatta et al. | 501/92 |
| 4,405,589 | 9/1983 | Iwai et al. | 423/344 |

FOREIGN PATENT DOCUMENTS 5891025 11/1981 Japan.
5891058 11/1981 Japan.

*Primary Examiner*—Stephen J. Lechert, Jr.
*Attorney, Agent, or Firm*—Leydig, Voit & Mayer, Ltd.

[57] ABSTRACT

Fine spherical amorphous powder represented by the general formula:

$$SiC_xN_yH_z$$

wherein $0.1 < x < 2.0$, $0.1 < y < 1.5$ and $0 < z < 4$, is prepared by vapor phase oxidation of organosilicon compound substantially free from halogen atoms and oxygen atoms. An ultimately crystalline, uniform and fine powder of silicon nitride and silicon carbide is prepared by heat treatment of the fine spherical amorphous powder. The powder and the crystalline uniform, and fine powder are used as raw materials for composite ceramics and as functional materials for solar cell.

16 Claims, 3 Drawing Figures

F I G. 1
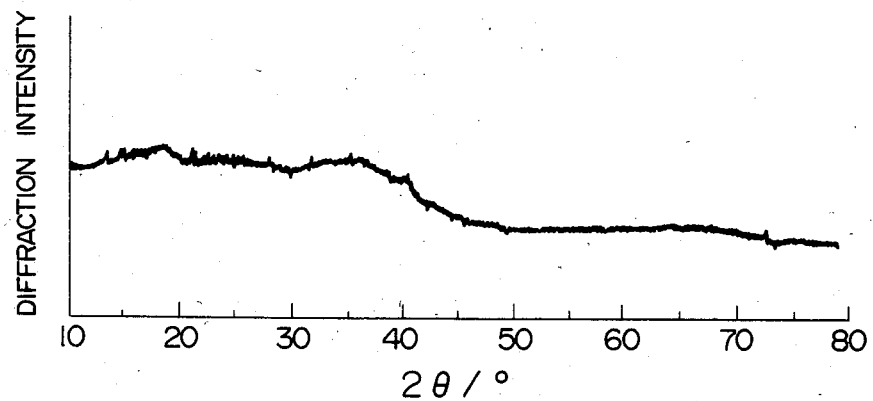
F I G. 2
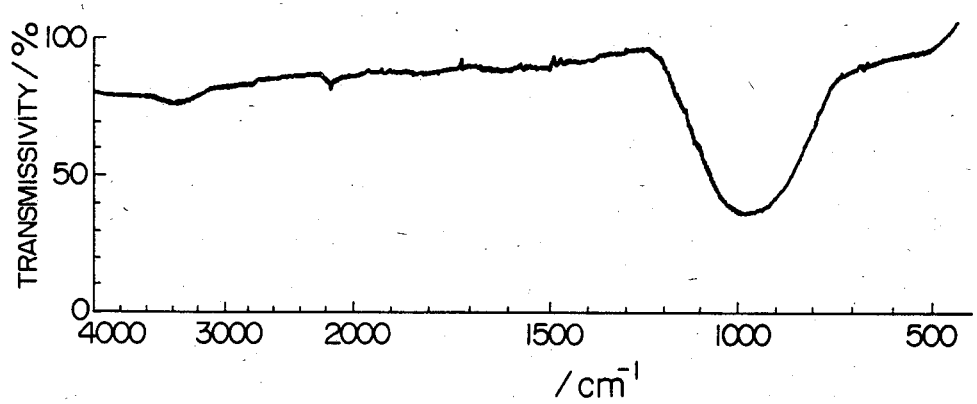

FINE AMORPHOUS POWDER AND PROCESS FOR PREPARING FINE POWDERY MIXTURE OF SILICON NITRIDE AND SILICON CARBIDE

BACKGROUND OF THE INVENTION

This invention relates to novel fine amorphous powder and a process for preparing fine powdery mixture of silicon nitride and silicon carbide.

Silicon nitride or silicon carbide ceramics are distinguished in high temperature characteristics such as high temperature strength, high thermal shock resistance, etc., as compared with oxide-based ceramics including alumina as a typical oxide ceramic, and extensive research has been so far made for their processes and applications. Their uses as high temperature materials such as heat-resistant structural materials for gas turbines, diesel engines, heat exchangers, etc. working at a high temperature have been promising.

However, silicon nitride and silicon carbide ceramics have the following drawbacks in spite of the distinguished high temperature characteristics. For example, silicon nitride ceramics having a distinguished thermal shock resistance have poor mechanical strength and oxidation resistance at a high temperature, whereas silicon carbide ceramics having a distinguished oxidation resistance have a poor thermal shock resistance.

To improve these drawbacks, processes for preparing composite ceramics containing silicon nitride and silicon carbide have been studied, and for example, the following processes are known:

(1) A process comprising mechanically mixing silicon nitride powder with silicon carbide powder, and sintering the mixture by hot pressing.

(2) A process comprising molding a mixture of silicon carbide and silicon in advance, and then subjecting the molding to nitriding reaction, thereby forming silicon nitride portions, or molding a mixture of silicon nitride and carbon in advance and then subjecting the mixture to silicon permeation, thereby forming silicon carbide portions, both according to a sintering reaction.

(3) A process comprising adding silicon powder to organosilicon polymers as a starting material, molding the mixture, and then subjecting the molding to a nitriding reaction, thereby forming both silicon carbide portions and silicon nitride portions.

However, these attempts still have the following drawbacks: when the conventional starting material powder is used, there is a limit to thorough control of mixing degree as well as particle characteristics such as particle size, shapes, etc., and also to uniform mixing of the component particles; the starting material powder is liable to be contaminated with impurities owing to the mechanical pulverization and mixing, and a desired satisfactory sintered product may not be obtained; even the reaction sintering may make the sintered product porous, or complicate the steps or operations, or may have a limit to the homogeneity of the composition, and a desired satisfactory sintered product may not be obtained.

SUMMARY OF THE INVENTION

An object of the present invention is to provide novel fine spherical amorphous powder consisting only of Si, C, N and H, obtained by vapor phase reaction of an organosilicon compound free from halogen and oxygen.

Another object of the present invention is to provide a process for preparing ultimately crystalline, uniform, and fine powdery mixture of silicon nitride and silicon carbide by heat treating the said novel fine spherical amorphous powder.

According to the present invention, novel fine spherical amorphous powder consisting only of Si, C, N and H, represented by the general formula $SiC_xN_yH_z$, wherein $0.1<x<2.0$, $0.1<y<1.5$ and $0<z<4$, can be prepared by vapor phase reaction of an organosilicon compound free from halogen and oxygen, and further an ultimatery crystalline, uniform and fine powdery mixture of silicon nitride and silicon carbide with a high purity can be prepared by heat treatment of the said amorphous powder in a non-oxidative gas atmosphere.

The present amorphous powder, when subjected to X-ray powder diffraction, has no diffractions originating from silicon nitride, silicon carbide, metallic silicon or graphite carbon component, and no fine crystal grains are observed at all in the powder even by electron beam diffraction.

The present fine amorphous powder is thermally stable at the heat treatment temperature, with much less change in the composition, except for prolonged heating, for example, at 1,000° C.

The present amorphous powder has particle sizes of submicron order, and is usually spherical particles having particle sizes of 0.2 to 0.05 μm, and a very narrow particle size distribution.

The bonding state of silicon, carbon, nitrogen and hydrogen atoms in the present fine amorphous powder has not been clarified yet, but the present fine amorphous powder has been found to have partial structures of N—H, C—H and Si—H owing to broad peaks by IR absorption spectra.

The present fine amorphous powder can be represented by the following general formula:

wherein $0.1<x<2.0$, $0.1<y<1.5$, and $0<z<4$.

The present amorphous powder can have a composition within the said range, and is suitable for preparing ceramics.

When the present amorphous powder is heated at a temperature of 1,300° C. or higher, excess hydrogen, carbon or nitrogen is released to form an ultimately crystalline, uniform, and fine powdery mixture of silicon nitride and silicon carbide. The crystal can be formed in a spherical, whisker, platy or other shape, depending on the heating condition and composition. It is also possible to obtain a mixture of crystalline and amorphous powders in any desired proportion by controlling the degree of crystallization.

To prepare the present amorphous powder, the starting material is subjected to vapor phase reaction by external heating based on resistance heating or high frequency heating or in a plasma.

The starting material for preparing the present amorphous powder is an organosilicon compound substantially free from halogen atoms and oxygen atoms, and is supplied to a reactor together with a non-oxidative gas such as $NH_3$, $H_2$, $N_2$, Ar, He, etc.

When the starting organosilicon compounds contain halogen atoms or oxygen atoms, the halogen atoms or oxygen atoms remain in the fine amorphous powder even after the vapor phase reaction, and the present amorphous powder cannot be obtained.

The starting organosilicon compounds include nitrogen-containing organosilicon compounds consisting only of Si, N, C and H, such as silazane, aminosilane, cyanosilane, etc. and polysilane, polycarbosilane, etc. consisting only of Si, C and H. The starting materials can be exemplified as follows:

1. Silazane compounds represented by the following general formulae [R¹R²R³Si]₂NR⁴, or $-R^1R^2Si-NR^3]_{\overline{n}}$, wherein R¹ to R⁴ are hydrogen atoms, alkyl groups, aryl groups, and phenyl groups, and n is 3 or 4, for example, [HSi(CH₃)₂]₂NH, [(CH₃)₃Si]₂NH, [(CH₃)₃Si]₂NCH₃, [(CH₂=CH)Si(CH₃)₂]NH, $+(CH_3)_2Si-NH]_{\overline{3}}$, $+(CH_3)_2Si-NCH_3]_3$, etc., or 6-membered cyclic tris(N-methylamino)-tri-N-methylcyclotrisilazane having an N-methylamino group on the silicon atom as a substituent, represented by the following formula:

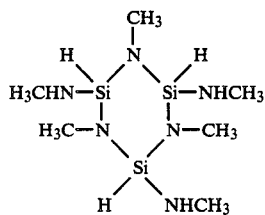

2. Organosilicon compounds represented by the following general formula RnSi(NR'R")ₘ, wherein R, R' and R" are hydrogen atoms, alkyl groups, aryl groups and phenyl groups, excluding R, R', and R" being hydrogen atoms simultaneously, and n=0 to 3 and m=4−n, for example, aminosilicon compounds such as CH₃Si(NHCH₃)₃, (CH₃)₂Si(NHCH₃)₂, (CH₃)₂Si[N(CH₃)₂]₂, etc.

3. Organosilicon compounds represented by the following general formula RnSi(CN)ₘ, wherein R is a hydrogen atom, an alkyl group, an aryl group or a phenyl group, and n=0 to 3 and m=4−n, for example, cyanosilicon compounds such as H₃SiCN, (CH₃)₃SiCN, (CH₃)₂Si(CN)₂, (CH₂=CH)CH₃Si(CN)₂, (C₆H₅)₃Si(CN), (C₆H₅)₂Si(CN)₂, etc.

4. Organosilicon compounds represented by the following general formula R₂ₙ₊₂(Si)ₙ, wherein R is a hydrogen atom, an alkyl group, an aryl group, or a phenyl group, excluding Rs being hydrogen atoms simultaneously, and n is 1 to 4 or organosilicon compounds represented by the following general formula R₃Si+R'—R₂Si]ₘR, wherein R is a hydrogen atom, an alkyl group, an aryl group, or a phenyl group; R' is a methylene group, an ethylene group or a phenylene group, and m is 1 to 2, for example, (C₂H₅)₂SiH₂,

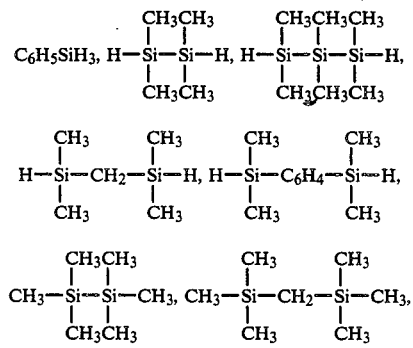

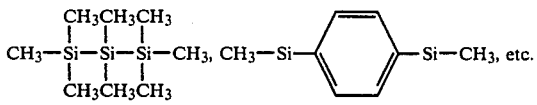

These starting compounds can be purified to a very high purity according to the conventional procedure of distillation, sublimation, etc. These starting compounds can be supplied alone or in a mixture of at least two thereof to the vapor phase reaction system.

When the starting compound is in a liquid or solid state at room temperature, it is important to vaporize the starting compound by an appropriate means, such as an indirect heating means, etc. and then supply the gaseous starting compound to the vapor phase reaction system and obtain uniform, fine amorphous powder.

Furthermore, it is possible not only to adjust the partial pressure of the starting compound and control its feed rate by supplying the starting compound together with a non-oxidative gas such as NH₃, H₂, N₂, Ar, He, etc., but also to control the composition of the fine amorphous powder (C/N ratio) by selecting the non-oxidative gas such as NH₃, H₂, N₂, Ar, He, etc., or its mixing ratio. For example, to increase the nitrogen content of the fine amorphous powder, NH₃ is particularly preferable as the non-oxidative gas. In the case of polysilanes and polycarbosilanes consisting only of Si, C and H as the starting compound, it is also possible to readily introduce nitrogen into the resulting fine amorphous powder by using NH₃ as the non-oxidative gas, where active species such as NH or NH₂ generated by thermal decomposition of NH₃ attack silicon atoms, while releasing the carbon components as hydrocarbons such as CH₄, etc., and thus the nitrogen atoms can effectively combine with silicon atoms. NH₃ can act as a hydrogen source like H₂ as the non-oxidative gas. Such hydrogen can readily initiate hydrogenation-dehydrogenation of starting organosilicon compounds and lead them to fine amorphous powder of desired composition. NH₃ is used in an atomic ratio of nitrogen of NH₃ to silicon of the starting compound, that is, N/Si<10, whereas H₂ is used in an atomic ratio of hydrogen of H2 to Si of the starting compound, that is, H/Si<100. By proper selection of the reaction temperature and reaction time within said range of the atomic ratios, the present fine amorphous powder can be prepared.

In the vapor phase reaction, the reaction temperature is in a range of 600° to 1,600° C., preferably 800° to 1,400° C. When the reaction temperature is below 600° C., it does not proceed completely, and sometimes unpreferable polymers of organosilicon compound may be formed. The resulting polymers have more organic groups, and thus have a poor heat stability. That is, the composition vigorously changes below the heat treatment temperature, and also the shape is variable, resulting in formation of resinous product. Thus, the object of the present invention cannot be attained below 600° C.

On the other hand, when the reaction temperature is above 1,600° C., metallic silicon, carbon, etc. considerably deposit, and thus this is not practical.

In the vapor phase reaction, the partial pressure of starting compound and the reaction time depend on the desired particle size of the fine amorphous powder, space-time-yield (STY), etc. The partial pressure of starting compound as a gas is 0.001 to a few atmospheres, preferably 0.01 to 0.5 atmospheres. The reaction time is usually 120 to 0.05 seconds, preferably 60 to 0.1 second.

When the partial pressure of gaseous starting compound is lower than the lower limit value, or the reaction time is longer than the upper limit value, the reactor must be made unnecessarily larger, and this makes the process commercially disadvantageous. On the other hand, when the partial pressure is higher than the upper limit value or the reaction time is shorter than the lower limit value, the vapor phase reaction may sometimes fail to proceed substantially.

By an appropriate combination of the species of starting compound, species of non-oxidative gas, and reaction conditions, it is possible to prepare fine spherical amorphous powder in a wide range of composition.

The present amorphous powder is used not only as a starting material for composite ceramics, but also as functional materials for solar cell, etc.

The present invention will be described in detail below, referring to Examples and Drawings.

BRIEF DESCRIPTION OF THE DRAWINGS

FIG. 1 is an X-ray diffraction pattern of fine amorphous powder prepared according to Example 1.

FIG. 2 is an infrared absorption spectrum of fine amorphous powder prepared according to Example 1.

PREFERRED EMBODIMENT OF THE INVENTION

EXAMPLE 1

Figure 3:
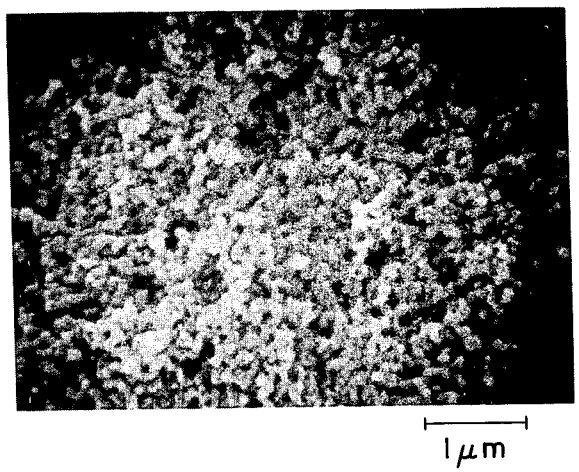
FIG. 3 is a scanning electron-microscopic picture of fine amorphous powder prepared according to Example 1.

A high purity alumina reactor tube, 25 mm in inner diameter and 700 mm long, was placed in an electric furnace, and trimethylcyanosilane as a starting compound was introduced into a preheater at a predetermined rate to completely vaporize the starting compound, and then mixed thoroughly with $H_2$, Ar and $NH_3$ at predetermined rates to make a feed gas having a ratio of $(CH_3)_3SiCN:H_2: Ar:NH_3 = 5.0:43.0:46.0:6.0$ by volume. The feed gas was introduced into the reactor tube, and passed through the reaction zone kept at 1,200.° C. for a residence time of 1.2 seconds.

The reaction mixture was led to a trap to capture the product fine amorphous powder. The reaction conditions and the composition of the thus obtained powder are shown in Table 1. An X-ray diffraction, infrared absorption spectrum and scanning electron-microscopic picture of fine amorphous powder thus prepared are shown in FIGS. 1, 2 and 3, respectively.

EXAMPLES 2 TO 12

Vapor phase reactions of various starting compounds were carried out in the same apparatus as used in Example 1. The species of starting compounds, reaction conditions, and the composition of the product are shown in Table 1.

TABLE 1

| | | | Reaction Conditions | | | | | | | |
|---|---|---|---|---|---|---|---|---|---|---|
| | | | | Feed | | | | | | |
| Ex. No. | Organosilicon Compound | Reaction temp. (°C.) | Reaction time (sec.) | Organosilicon compound (vol %) | $H_2$ (vol %) | Ar (vol %) | $NH_3$ (vol %) | Composition of the product $SiC_xN_yH_z$ | | |
| | | | | | | | | x | y | z |
| 1 | $(CH_3)_3SiCN$ | 1200 | 1.2 | 5.0 | 43.0 | 46.0 | 6.0 | 0.62 | 0.99 | 0.15 |
| 2 | $(CH_3)_3SiCN$ | 1200 | 2.3 | 2.8 | — | 89.1 | 8.1 | 0.49 | 1.35 | 0.43 |
| 3 | $(CH_3)_2Si(CN)_2$ | 1200 | 1.9 | 2.4 | — | 91.3 | 6.3 | 1.46 | 0.59 | 0.33 |
| 4 | $CH_3Si(NHCH_3)_3$ | 1200 | 2.5 | 6.3 | — | 89.3 | 4.4 | 0.58 | 1.23 | 0.74 |
| 5 | $CH_3Si(NHCH_3)_3$ | 1300 | 1.0 | 5.8 | — | 94.2 | — | 1.05 | 1.14 | 0.28 |
| 6 | $CH_3Si(NHCH_3)_3$ | 1300 | 0.9 | 3.8 | 71.4 | 24.8 | — | 0.56 | 1.08 | 0.50 |
| 7 | $CH_3Si(NHCH_3)_3$ | 1100 | 1.1 | 3.3 | 70.6 | 26.1 | — | 0.34 | 0.91 | 0.50 |
| 8 | $(CH_3)_2Si[N(CH_3)_2]_2$ | 1200 | 2.9 | 5.7 | — | 95.3 | — | 1.76 | 1.03 | 0.26 |
| 9 | $[Si(CH_3)_3]_2NH$ | 1200 | 2.6 | 6.1 | — | 73.8 | 20.1 | 0.46 | 1.10 | 0.59 |
| 10 | $(CH_3)_4Si$ | 1200 | 2.2 | 17.6 | — | 31.9 | 50.5 | 0.74 | 1.11 | 0.53 |
| 11 | $[(CH_3)_3Si]_2$ | 1200 | 2.0 | 7.4 | — | 30.9 | 61.7 | 0.57 | 0.88 | 0.87 |
| 12 | $[(CH_3)_3Si]_2CH_2$ | 1100 | 2.4 | 5.2 | — | 82.5 | 12.3 | 1.06 | 0.65 | 0.55 |

As shown above, the present fine amorphous powder can be prepared from various starting compounds. By heat treating the thus obtained fine amorphous powder, ultimately crystalline, uniform and fine powder of silicon nitride and silicon carbide can be prepared. The heat treatment conditions are a temperature of 1,300° to 1,550° C. for a time of 0.5 to 24 hours in an atmosphere of non-oxidative gas such as Ar, He, $H_2$ or $N_2$ alone or in a mixture thereof.

By the heat treatment, the present fine amorphous powder release excess C, N and H and undergoes crystallization, leading to ultimately crystalline, uniform and fine powdery mixture of silicon nitride and silicon carbide. By proper selection of the heat treatment conditions, a mixed powder of crystalline silicon nitride and/or crystalline silicon carbide, the remainder being amorphous powder can be prepared.

In the following Examples, fine crystalline powdery mixture of silicon nitride and silicon carbide are prepared from cyanosilane, aminosilane, silazane, polycarbosilane, etc. as the starting compounds.

EXAMPLES 13 TO 17

Vapor phase reaction of organosilicon compounds having a cyano group was carried out in the same apparatus as used in Example 1 in the similar manner to that of Example 1. All the fine amorphous powders captured in the trap were spherical particles having particle size of not more than 1 μm.

Then, the amorphous powder was filled in a high purity alumina tube in an inert atmosphere and treated in an electric furnace heated at 1,500° C. in an argon atmosphere for 2 hours. The reaction conditions and X-ray analysis of crystalline powder are shown in Table 2. It was found by X-ray diffraction that all the crystalline powders contained only β-SiC and αSi$_3$N$_4$ components, and also found by fluoroscent X-ray analysis of impurities that the contents of Fe, Al, Ca and K were all below 10 ppm, and the content of Cl was below 100 ppm.

TABLE 2

|  | Ex. No. | | | | |
|---|---|---|---|---|---|
|  | 13 | 14 | 15 | 16 | 17 |
| Reaction temp. (°C.) | 1200 | 1400 | 1000 | 1200 | 1400 |
| Reaction time (sec) | 1.8 | 1.8 | 1.3 | 1.8 | 3.2 |
| Cyanoorganosilicon compound (vol %) | $(CH_3)_3SiCN$ 8.5 | $(CH_3)_3SiCN$ 3.4 | $(CH_3)_3SiCN$ 4.7 | $(CH_3)_3SiCN$ 3.0 | $(CH_3)_3SiCN$ 4.9 |
| $H_2$ (vol %) | 0 | 0 | 40.4 | 0 | 0 |
| $N_2$ (vol %) | 73.6 | 85.6 | 43.1 | 92.5 | 95.1 |
| $NH_3$ (vol %) | 17.9 | 11.0 | 11.8 | 4.5 | 0 |
| SiC (wt %) | 67.0 | 25.4 | 7.5 | 92.7 | 98.2 |
| $Si_3N_4$ (wt %) | 33.0 | 74.6 | 92.5 | 7.3 | 1.8 |

EXAMPLES 18 TO 21

Crystalline powdery mixtures of silicon nitride and silicon carbide were prepared from aminosilane compounds as the starting compounds through vapor phase reaction and successive heat treatment in the same manner as in Example 13. The vapor phase reaction conditions and X-ray analysis of the heat treated product are shown in Table 3 (the heat treatment conditions were the same as in Example 13). It was found by the fluorescent X-ray analysis of impurities that the contents of Fe, Al, Ca and K were all below 10 ppm, and that of Cl was below 100 ppm.

TABLE 3

|  | Ex. No. | | | |
|---|---|---|---|---|
|  | 18 | 19 | 20 | 21 |
| Reaction temp. (°C.) | 1200 | 1300 | 1100 | 1200 |
| Reaction time (sec) | 2.5 | 1.0 | 1.1 | 2.9 |
| Aminoorganosilicon compound (vol %) | $CH_3Si(NHCH_3)_2$ 6.3 | Same as left 5.8 | Same as left 3.3 | $CH_2Si(N(CH_3)_2)_3$ 5.2 |
| $H_2$ (vol %) | 0 | 0 | 71.8 | 0 |
| $NH_3$ (vol %) | 4.1 | 0 | 0 | 23.7 |
| Ar (vol %) | 89.6 | 94.2 | 24.9 | 71.1 |
| SiC (wt %) | 67 | 93 | 22 | 71 |
| SiN (wt %) | 33 | 7 | 78 | 29 |

EXAMPLES 22 TO 25

Crystalline powdery mixtures of silicon nitride and silicon carbide were prepared from silazane compounds as the starting compounds through vapor phase reaction and successive heat treatment in the same manner as in Example 13.

The vapor phase reaction conditions and X-ray analysis of the heat treated product are shown in Table 4 (the heat treatment conditions were the same as in Example 13). It was found by fluorescent X-ray analysis of impurities that the contents of Fe, Al, Ca, and Ka were all below 10 ppm and that of Cl was below 100 ppm.

TABLE 4

|  | 22 | 23 | 24 | 25 |
|---|---|---|---|---|
| Reaction temp. (° C.) | 1200 | 1200 | 1200 | 1000 |
| Reaction time (sec) | 2.5 | 2.5 | 2.3 | 2.7 |
| Silazane compound (vol%) | $[(CH_3)_3Si]_2NH$ 6.0 | 3.4 | $[—(CH_3)_2SiNH—]$ 2.3 | 2.1 |
| $H_2$ (vol %) | 0 | 30.5 | 0 | 0 |
| $N_2$ (vol %) | 82.0 | 47.1 | 94.5 | 97.9 |
| $NH_3$ (vol %) | 12.0 | 19.0 | 3.2 | 0 |
| SiC (wt %) | 54.8 | 16.1 | 35.0 | 88.9 |
| $Si_3N_4$ (wt %) | 45.2 | 83.9 | 65.0 | 11.1 |

EXAMPLES 26 TO 28

Crystalline powdery mixtures of silicon nitride and silicon carbide were prepared from silane, polysilane and polycarbosilane compounds as the starting compounds through vapor phase reaction and successive heat treatment in the same manner as in Example 13.

The vapor phase reaction conditions and X-ray analysis of the heat treatment products are shown in Table 5 (the heat treatment conditions were the same as in Example 13). It was found by fluorescent X-ray analysis of impurities that the contents of Fe, Al, Ca, and K were all below 10 ppm and that of Cl was below 100 ppm.

TABLE 5

|  | 26 | 27 | 28 |
|---|---|---|---|
| Reaction temp. (°C.) | 1200 | 1200 | 1100 |
| Reaction time (sec) | 2.2 | 2.0 | 2.4 |
| Organosilicon compound (vol %) | $(CH_3)_4Si$ 17.6 | $[(CH_3)_3Si]_2$ 7.4 | $[(CH_3)_3Si]_2CH_2$ 5.2 |
| $NH_3$ (vol %) | 50.5 | 61.7 | 12.3 |
| Ar (vol %) | 31.9 | 30.9 | 82.5 |
| SiC (wt %) | 42.5 | 35.6 | 72.1 |
| $Si_3N_4$ (wt %) | 57.5 | 64.4 | 27.9 |

What is claimed is:

1. Fine, spherical, substantially halogen-free and oxygen-free amorphous powder having the general formula:

$$SiC_xN_yH_z$$

wherein $0.1 < x < 2.0$, $0.1 < y < 1.5$ and $0 < z < 4$.

2. A process for preparing fine, spherical, amorphous powder represented by the general formula:

$$SiC_xN_yH_z$$

wherein $0.1 < x < 2.0$, $0.1 < y < 1.5$ and $0 < z < 4$, which comprises conducting a vapor phase reaction of a nitrogen-containing organosilicon compound substantially free from halogen atoms and oxygen atoms.

3. A process according to claim 2, wherein the nitrogen-containing organosilicon compound is a silazane compound represented by the general formula:

$$[R^1R^2R^3Si]_2NR^4 \text{ or}$$

$$\{R^1R^2Si-NR^3\}_n$$

wherein $R^1$ to $R^4$ are hydrogen atoms, alkyl groups, aryl groups or phenyl groups, excluding $R^1$ to $R^4$ being hydrogen atoms simultaneously and n is 3 or 4.

4. A process according to claim 2, wherein the nitrogen-containing organosilicon compound is an aminoorganosilicon compound represented by the general formula:

$$R_nSi(NR'R'')_m$$

wherein R, R' and R'' are hydrogen atoms, alkyl group, aryl groups and phenyl groups, excluding R, R', and R'' being hydrogen atoms simultaneously, and n=0 to 3 and m=4−n.

5. A process according to claim 2, wherein the nitrogen-containing organosilicon compound is a silane compound represented by the general formula:

$$R_nSi(CN)_m$$

wherein R is a hydrogen atom, an alkyl group, an aryl group or a phenyl group, and n=0 to 3 and m=4−n.

6. A process for preparing fine spherical amorphous powder represented by the general formula:

$$SiC_xN_yH_z$$

wherein $0.1 < x < 2.0$, $0.1 < y < 1.5$ and $0 < z < 4$, which comprises conducting a vapor phase reaction of
(1) an organosilicon compound represented by the following general formula $R_{2n+2}(Si)_n$, wherein R is a hydrogen atom, an alkyl group, an aryl group, or a phenyl group, excluding Rs being hydrogen atoms simultaneously, and n is 1 to 4
(2) organosilicon compound represented by the following general formula $R_3Si-R'-R_2Si)_mR$, wherein R is a hydrogen atom, an alkyl group, an aryl group, or a phenyl group; R' is a methylene group, an ethylene group or a phenylene group, and m is 1 to 2.

7. A process according to claim 2, wherein the vapor phase reaction is carried out at 600° to 1,600° C.

8. A process according to claim 2, wherein the vapor phase reaction is carried out in a non-oxidative gas atmosphere of Ar, He, $N_2$, $NH_3$ or $H_2$.

9. A process according to claim 8, wherein the amount of $NH_3$ is in an atomic ratio of N in $NH_3$ to Si in the starting compound, N/Si, of less than 10.

10. A process according to claim 8, wherein the amount of $H_2$ is in an atomic ratio of H in $H_2$ to Si in the starting compound, H/Si, of less than 100.

11. A process for preparing a fine powdery mixture of crystalline silicon nitride and crystalline silicon carbide which comprises heat treating fine, spherical, substantially halogen-free and oxygen-free amorphous powder represented by the general formula:

$$SiC_xN_yH_z$$

wherein $0.1 < x < 2.0$, $0.1 < y$ $1.5$ and $0 < z < 4$.

12. A process for preparing a fine powdery mixture of at least one of crystalline silicon nitride and crystalline silicon carbide, the remainder being amorphous powder, which comprises heat treating fine, spherical, substantially halogen-free and oxygen-free amorphous powder represented by the general formula:

$$SiC_xN_yH_z$$

wherein $0.1 < x < 2.0$, $0.1 < y < 1.5$ and $0 < z < 4$.

13. A process according to claim 11, wherein the heat treatment is carried out at 1,300° to 1,550° C.

14. A process according to claim 11, wherein the heat treatment is carried out in an inert gas atmosphere of at least one of Ar, He, $H_2$, and $N_2$.

15. A process according to claim 12, wherein the heat treatment is carried out at 1,300 degrees to 1,550 degrees Celsius.

16. Fine, spherical, amorphous powder having the general formula:

$$SiC_xN_yH_z$$

wherein $0.1 < x < 2.0$, $0.1 < y < 1.5$ and $0 < z < 4$, prepared by conducting a vapor phase reaction of a nitrogen-containing organosilicon compound substantially free from halogen atoms and oxygen atoms.

* * * * *